United States Patent [19]

Smythe et al.

[11] Patent Number: 5,134,000
[45] Date of Patent: Jul. 28, 1992

[54] HEAT SHRINKABLE PROTECTIVE SHEETS AND METHODS FOR THEIR MANUFACTURE

[75] Inventors: James L. Smythe, Emsdale; D. Brian W. Yawney, Mississauga; John H. Oliver, Huntsville; Peter Jackson, Etobicoke, all of Canada

[73] Assignee: Shaw Industries Ltd., Rexdale, Canada

[21] Appl. No.: 519,473

[22] Filed: May 7, 1990

Related U.S. Application Data

[63] Continuation-in-part of Ser. No. 392,043, Aug. 10, 1989, abandoned.

[51] Int. Cl.⁵ .................. B65D 65/02; B32B 7/00
[52] U.S. Cl. .................. 428/34.9; 428/35.1; 428/35.2; 428/57; 428/913; 428/349; 428/192; 428/195; 428/212; 428/215; 428/500; 138/156; 138/170; 138/128; 138/104; 138/109; 174/DIG. 8
[58] Field of Search .......... 428/34.9, 35.1, 35.2, 428/35.3, 57, 77, 913, 347, 349, 192, 195, 212, 215, 500; 174/DIG. 8; 138/156, 170, 128, 104, 109

[56] References Cited

U.S. PATENT DOCUMENTS

| | | | |
|---|---|---|---|
| 2,387,566 | 10/1945 | Custers | 154/42 |
| 3,322,593 | 5/1967 | Conti | 156/307 |
| 3,607,544 | 9/1971 | Earner et al. | 156/307 |
| 3,959,052 | 5/1976 | Stanek | 156/86 |
| 4,025,375 | 5/1977 | Leasure | 156/79 |
| 4,061,519 | 12/1977 | Hammer | 156/244 |
| 4,146,419 | 3/1979 | Neidhart | 156/391 |
| 4,200,676 | 4/1980 | Caponigro et al. | 428/57 |
| 4,356,222 | 10/1982 | Harakawa et al. | 428/78 |
| 4,378,393 | 3/1983 | Smuckler | 428/99 |
| 4,472,468 | 9/1984 | Tailor | 428/57 |
| 4,605,578 | 8/1986 | Emrich et al. | 428/57 |
| 4,737,212 | 4/1988 | Emrich et al. | 156/157 |
| 4,795,509 | 1/1989 | De Bruycker | 428/34.9 |
| 4,803,104 | 2/1989 | Peigneur | 428/35.1 |
| 4,902,373 | 2/1990 | Regipa | 156/47 |

FOREIGN PATENT DOCUMENTS

| | | |
|---|---|---|
| 0143457 | 6/1985 | European Pat. Off. |
| 866063 | 4/1961 | United Kingdom. |
| 1346479 | 2/1974 | United Kingdom. |
| 2082500A | 3/1982 | United Kingdom. |
| 82/02412 | 7/1982 | World Int. Prop. O. |

Primary Examiner—Ellis P. Robinson
Assistant Examiner—Rena L. Dye
Attorney, Agent, or Firm—Ridout & Maybee

[57] ABSTRACT

A heat shrinkable wrap-around sleeve comprises a heat shrinkable sheet with a heat stable strip welded on one end. The free end of the heat stable strip is overlapped on the outer side of the opposite end of the sheet and welded thereto by heating applied directly on the outer side. This allows a good quality welded connection to be formed without requiring the use of hold-down adhesives. The sleeve can be manufactured using induction welding or more preferably by heated wedged welding.

14 Claims, 3 Drawing Sheets

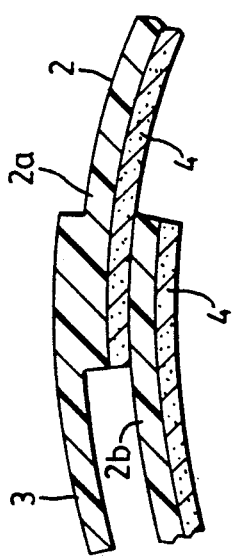
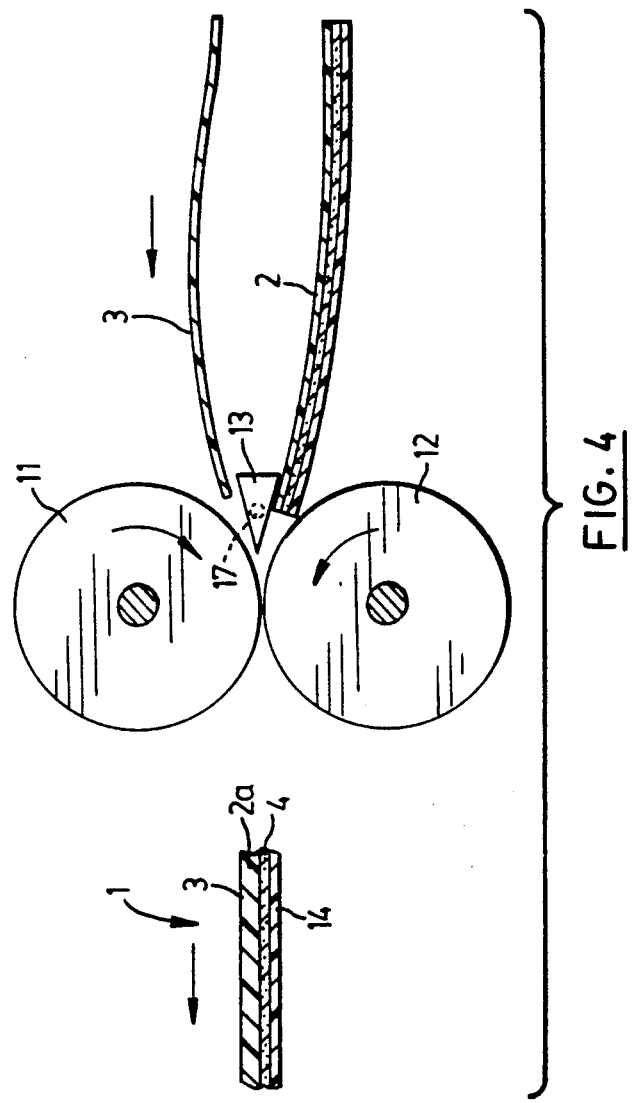

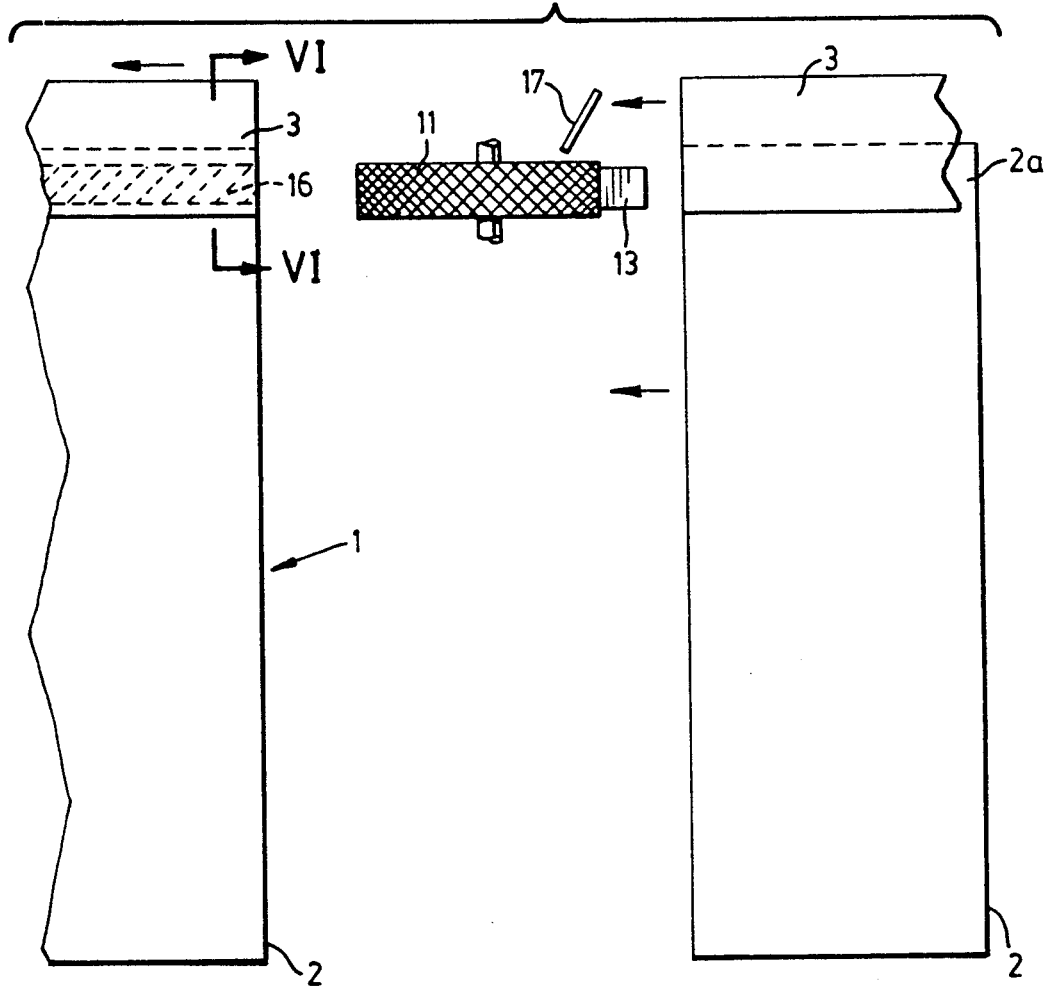
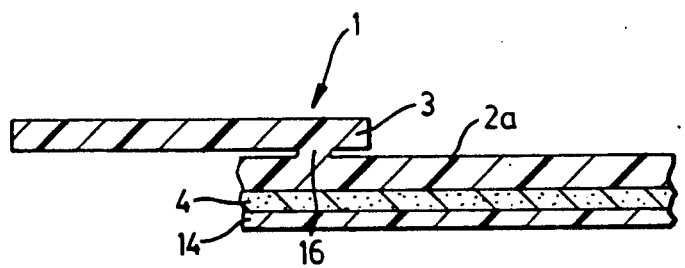

HEAT SHRINKABLE PROTECTIVE SHEETS AND METHODS FOR THEIR MANUFACTURE

This application is a continuation-in-part of application Ser. No. 07/392,043 filed Aug. 10, 1989 now abandoned.

The present invention relates to heat shrinkable protective sheets useful as protective coverings which may be used in, for example, sealing and protecting pipe weld joints, telephone cables, electrical splices, pipelines and the like, from adverse environmental conditions such as corrosion and moisture.

It is known to use for this purpose heat shrinkable tubular sleeves formed by extrusion. However, there is difficulty in extruding sleeves of any diameter but especially greater than about 12 inches (about 30 cm). The procedures for imparting a heat shrink memory to and for stretching the sleeves are complex and difficult as well.

Another general type of heat shrinkable covering is represented by the so-called "wrap-around sleeve", one example of which is disclosed in U.S. Pat. No. 4,200,676 to D.A. Caponigro. While wrap-around sleeves are more versatile than tubular sleeves in that they can be readily applied to articles, including large diameter pipes, which do not have an accessible exposed end, the closure systems by which the adjoining ends of the sleeve are interconnected are an inherent source of weakness. Mechanical closure systems are especially vulnerable to damage, while conventionally bonded overlaps can permit slippage during application and subsequently creep due to the hoop stresses remaining in the shrunk sleeves and so render the sleeves less effective than those which have a continuous covering.

These problems have been largely overcome by the method in U.S. Pat. No. 4,472,468 in the name Tailor et al dated Sep. 18, 1984 assigned to the assignee of the present application, wherein a hold-down adhesive is used to bond together overlapped end portions of a heat shrinkable sheet before applying heat externally by means of a torch in order to weld the sheets together. The application of a hold-down adhesive to the sheet material is not always convenient or desirable, however.

The present invention provides a wrap-around sleeve in the form of a sheet of dimensionally heat unstable flexible material, on one end portion of which a dimensionally substantially heat stable closure strip is welded through a uniform and preferably homogeneous welded bond. In use, the sheet is wrapped around the article to be protected with the end portion having the closure strip overlapped on the opposite end portion. Direct heating can then be applied to weld the free edge of the dimensionally heat stable strip to the underlapping end portion. Heating of the welded sleeve thus formed can then be applied in any conventional manner in order to shrink the sleeve down to form a protective tightly wrapping covering around the article.

With prior attempts of which the inventors are aware, wherein two dimensionally heat unstable edges or pieces are welded together, problems have arisen in effecting a satisfactory weld.

One of the problems is that of peel back which occurs when two overlapping heat shrinkable sheets are heated. When heat is applied, the outside surface of the overlap tends to recover or shrink before the inside surface and thus there is differential contraction across the thickness of the sheets between the overlap and underlap. These problems are greatly mitigated with the structure of the invention, wherein only one of edges welded together is a heat shrinkable or otherwise dimensionally unstable material. As a result, it is possible to obtain welded bonds which are uniform and preferably homogeneous. By "uniform" is meant that the weld is of substantially uniform peel strength along its entire length. By "homogeneous" is meant that the area or line of welding between the heat stable strip and heat unstable sheet does not present a line of weakness, so that when subjected to peel strength testing the welded joint does not fail along an interface corresponding to the boundaries of the original strip and sheet.

The protective wrap-around sleeve of the present invention may be manufactured using, for example, the induction welding techniques which are described in more detail in U.S. patent application Ser. No. 7/392,043 filed Aug. 10, 1989, the disclosure of which is incorporated herein by reference.

In the preferred form, the protective wrap-around sleeve is manufactured by drawing the heat stable strip and heat unstable sheet over opposite sides of a heated member, the heating of which is controlled, in order to melt surface portions of the strip and the sheet, and then bringing the melted surface portions into contact. By carefully controlling the heating of the heated member, it is possible to melt only a thin skin portion of the strip or sheet in contact with the heated member. Surprisingly, it has been found that this welding method allows a satisfactory uniform and preferably homogeneous weld to be achieved between materials one or both of which are dimensionally heat unstable, without problems such as peel back or puckering of the welded portions occurring. It is believed that by heating and melting only a thin skin portion of the materials undergoing welding, this welding method does not heat the materials throughout their thickness sufficiently to cause their strengths to be impaired. As well, the weld is not substantially affected by forces of differential expansion or contraction between the two sheet materials which, in conventional methods of welding dimensionally heat unstable materials, result in the problems of peel back or puckering of the weld noted above.

Accordingly the present invention also provides a method of welding the edges of sheet material together to form a heat shrinkable protective covering, at least one of said edges constituting an end portion of a dimensionally heat unstable sheet material having been stretched in the longitudinal direction from an original heat stable form to a dimensionally heat unstable form capable of shrinking toward its original form by the application of heat alone, comprising drawing said edges over opposite sides of a heated member, controlling the heating of the member so that a thin skin portion of each opposing inner sides of each edge adjacent the heated member is melted, bringing the melted portions of the edges into contact and applying pressure to the edges to cause them to fuse together.

In the preferred form, this welding method is conducted using heated wedge welding apparatus, wherein the heated member is in the form of a wedge, which apparatus is in itself known and was used before the present invention for welding together fabric-reinforced polymer films or sheets, or other dimensionally heat stable films or sheets, for example in the manufacture of waterproof clothing Such welding apparatus and its use is described in a number of prior patents:

U.S. Pat. Nos.: 2,387,556; 3,322,593; 3,607,544; 4,146,419; 4,605,578; 4,737,212; and 4,744,855; as well as in published U.K. patent application 2,082,500A dated Mar. 10, 1982 in the name Gundle Holdings.

The above noted patents and U.K. patent application are hereby incorporated herein for their disclosures of heated wedge welding machines and their methods of use.

In the most preferred form, the heated wedge is equipped with thermistor controlled heating. This allows very accurate control over and precise maintenance of the temperature of the wedge, thus allowing close control of the thickness of the melted skin on the surface of the materials undergoing welding.

In some advantageous applications of the above-mentioned welding method, the edges being welded together may, for example, be the abutting longitudinally opposite ends of a piece of dimensionally heat unstable material having its ends brought together to form a tubular sleeve and the edges of a heat fusible but dimensionally heat stable closure tape overlapping the outer side of one or both of said ends.

In other advantageous applications, the two edges may be, for example, two overlapped ends of a single piece of the dimensionally heat unstable material again forming a tubular sleeve. Alternatively, the edges may be, for example, those of a panel of heat fusible but dimensionally heat stable panel applied over the overlap area of the overlapped ends of a piece of dimensionally heat unstable sheet material and extending a small distance over the exposed outer side of the underlap end portion. In such case normally the whole of the dimensionally heat stable panel is welded to the exposed outer sides of the overlap and underlap portions. With these procedures, heat shrinkable tubular sleeves are obtained.

In the preferred form, however, for producing the heat shrinkable wrap-around protective sleeves described above, the edges to be welded are the edge of a heat fusible and dimensionally heat stable strip overlapped on one end edge of a longitudinally shrinkable heat unstable sheet. As noted above, the free end of the strip extends a sufficient distance that when the two ends of the sheet are brought together and the end having the panel overlapped on the opposite end, the free end of the strip can be applied on the outer side of the underlap end. This product is useful as a wrap around sleeve. In the field, in applying the sleeve around a pipe or the like, the free end of the dimensionally heat stable strip is welded onto the outer side of the underlap end by direct heating applied thereon, for example with a propane flame or other torch flame, before being shrunk down onto the pipe or other article by application of heating in the normal manner.

The dimensionally heat unstable sheet material may typically have a shrink ratio of from about 1:1.05 to about 1:3.0, that is a shrinkage of about 5% to 67% based on the length of the unshrunk sheet.

The sheet material and strip are preferably organic polymeric materials, the same or different. For example, the material may be a polyolefin, a blend of polyolefins, or a blend of a polyolefin with an olefin copolymer, or with an elastomer, or with a mixture of these. Other polymeric materials which may be useful are elastomers such as butadiene-styrene copolymers, polybutadiene, silicone rubber, polybutene; plasticized polyvinylchloride, thermoplastic polyesters and polyurethane, ethylene propylene rubbers (EPDM) or blends of selected elastomers with polyolefins commonly referred to as thermoplastic elastomers. The most preferred polymeric materials are the polyolefins, e.g. polyethylenes, polypropylenes, various copolymers of ethylene and propylene, for example ethylene-ethylacrylate or ethylene-vinyl acetate copolymers in which repeat units derived from ethylene comonomer predominate (e.g. about 80% to 97%), and blends of such copolymers with polyethylene.

The dimensionally heat unstable sheet materials and the closure strips are preferably crosslinked polymeric material. In the case of, for example, a polyolefin dimensionally heat unstable sheet material, the material is preferably cross-linked to a degree of 25% to 85%, more preferably in the range 45% to 70%. In this connection, the degree of crosslinking of a given plastics material is definable by reference to solvent extraction tests conducted under standardized conditions on samples of the plastics. At zero crosslinking a solvent for the plastics will totally dissolve the plastics material, while a material which suffers no weight loss in such tests is regarded as 100% crosslinked. Intermediate degrees of crosslinking are indicated by proportionately intermediate percentage weight losses. The crosslinking can also be defined in terms of the tensile stress at 300% elongation and its ultimate elongation before failure, both measured at elevated temperature Preferably the tensile at 300% elongation at 135° C. is in the range about 10 to about 130 psi, more preferably about 15 to about 110 psi, and the ultimate elongation at 135° C. is about 700% to about 1300%, more preferably about 800% to about 1100%. The dimensionally substantially heat stable closure strip is preferably crosslinked to a degree somewhat higher than the dimensionally heat unstable material to which it is welded so that it will have good mechanical strength when hot during the procedure of shrinking down the wrap-around sleeve onto the pipe or other article during final use of the products.

Preferably, in order to provide a protective covering with good strength properties, the polymeric sheet materials and closure strips are of thickness about 0.015 to about 0.1 inches (about 0.4 mm to about 2.5 mm) more preferably about 0.025 to about 0.08 inches (about 0.6 to about 2 mm).

Advantageously, the inner side of the dimensionally heat unstable sheet material, that is, the side to be laid against the article to be protected, is lined with a functional coating. The coating may be, for example, a sealant, an adhesive material, a mastic, a grease, or a two-component curable composition. In the case in which the coating is an adhesive, this holds the sleeve more firmly on the article and reduces any tendency for the sleeve to become dislodged from the article. Mastics, when employed, can function both as an adhesive and as a sealant to effect a seal between the covering and the article. Examples of greases which may be employed include water-repellent greases such as silicone greases. These can be particularly useful when forming an insulating covering around telephone cables or electrical splices. Examples of two-component curable compositions which may be employed include heat-curable epoxy or urethane compositions which can form a corrosion-protective layer over the surface of a pipe to which the covering is applied.

Examples of suitable sealants include hot-melt adhesives Hot-melt adhesives for this purpose are well known in the art. However, as will be apparent to those skilled in the art, many fluid materials, which may be organic or inorganic and which may or may not be crystalline at ambient temperature and are rendered substantially non-crystalline on heat application can be used as the sealant. The important requirement, where adhesive sealant is used, is that it should be capable of flowing during the further heating step so as to allow unrestrained recovery of the sheet, to fill any voids and to effect a seal between the surface of the article and the sleeve as the latter shrinks. One advantage of the preferred welding method described above is that since little or no heat is transferred through the sheet material to the side having the functional coating, the method avoids substantial deformation or flow of the functional coating during the welding procedure.

Various embodiments of the method of the present invention will now be described by way of example only with reference to the accompanying drawings in which:

FIGS. 2 and 3 are cross-sections illustrating a welding procedure and the welded product, respectively;

FIG. 4 is a partially schematic side view, partially in cross-section, illustrating a further welding method in accordance with the invention;

FIG. 5 is a plan view corresponding to FIG. 4; and

FIG. 6 is a cross-section taken on the line VI—VI in FIG. 5.

Figure 1:
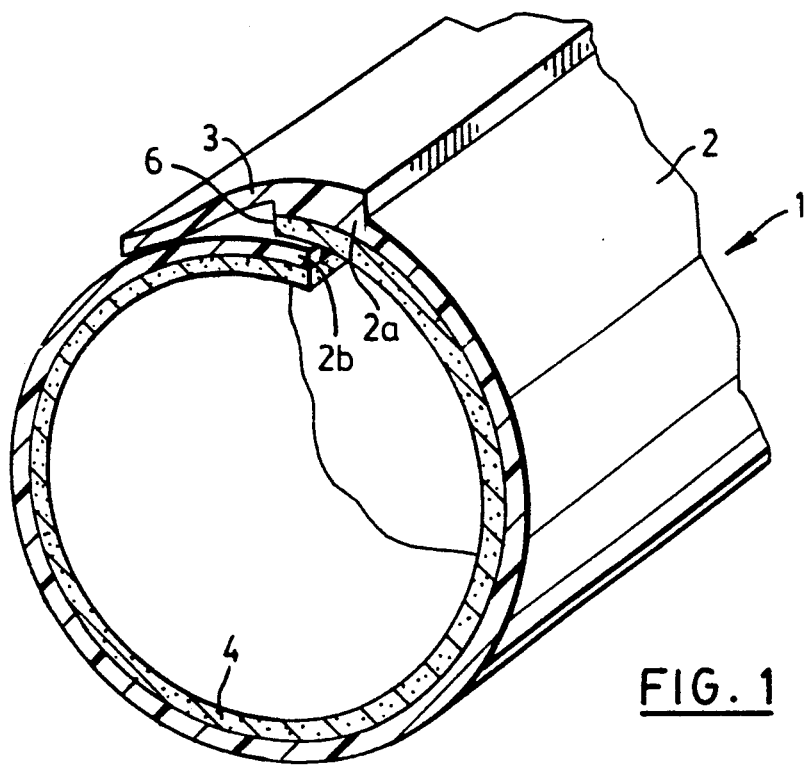
FIG. 1 shows partially schematically and partially in perspective a welded wrap-around sleeve in accordance with the invention.

Referring to the drawings, wherein like numerals indicate like parts, FIG. 1 shows a wrap-around sleeve 1 comprising a longitudinally heat shrinkable flexible polymeric sheet 2 having longitudinal end portions 2a and 2b. A substantially heat stable polymeric strip 3 is welded on the end portion 2a. The strip 3 is of sufficient width that when in use, the sleeve 1 is wrapped around an article to be protected (not shown), for example a pipe, with portions 2a overlapping on portion 2b, the free end of the strip 3 can be heated and/or pressed down onto the outer side of the sheet 2 and can be welded thereto by applying heat directly on the outer side of strip 3, using, for example, a propane torch or the like.

The inner side of the sheet 2 is coated with a functional coating 4.

In one preferred form, the strip 3 is clear. The underside of the strip 3 may be provided with a conventional temperature sensitive indicator, visible through the clear strip 3, which provides a visual indication of, for example, a colour change, when a temperature is reached at which the strip satisfactorily welds to the sheet 3. Usually, the coating 4 is softened by the heating subsequently applied to the sleeve 1 in the course of shrinking it down, and the hoop stress in the sleeve 1 causes the coating 4 to extrude to fill the channel or transition 6 between the end of the sheet 2 and the underside of the strip 3. Visual inspection of the coating 4 which fills the channel 6 provides the user with further visual assurance of the effectiveness of the seal provided by the shrunk-down sleeve.

Figure 2:
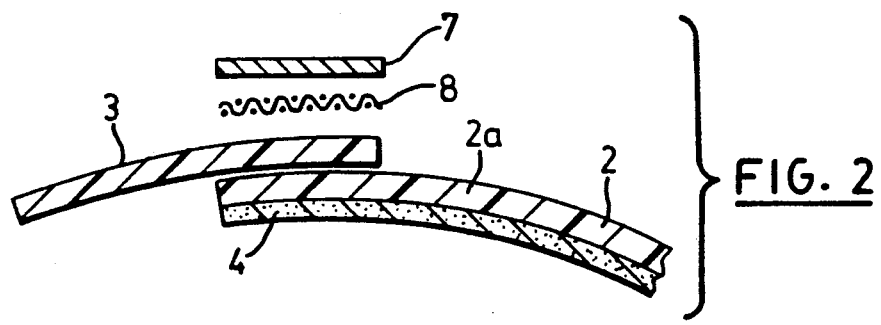

In FIG. 2, an inductively heatable susceptor strip 7, for example a steel strip, is applied on the outer side of the closure strip 3 and the assembly is pressed together and inductively heated as described in patent application Ser. No. 07/392,043 by exposure to an rf field. Heat is transferred from the strip 7 to the overlapping strip 3 an portion 2a which fuse together. A release film 8, for example of PTFE, may be used between the susceptor strip 7 and the closure strip 3 so that the film 8 and susceptor strip 7 may be easily removed from the welded product after completion of the weld.

FIG. 3 shows the end 2a bearing the fused on strip 3 overlapped on end 2b for welding thereto as described above with reference to FIG. 1.

In FIGS. 4 and 5, there are shown the driven pressing or nip rollers 11 and 12 and heated wedge 13 of a heated wedge welding machine such as, for example, a machine of the kind available from Pfaff Industrie maschiner GmbH, Federal Republic of Germany.

The strip 3 and sheet 2 in superposed relationship are fed in from one side of the wedge 13. As the lower side of the strip 3 and the upper side of the sheet 2 pass over the surfaces of the wedge 3, thin surface skin portions thereof become melted dependent on the temperature of the wedge 13, which is closely controlled. The materials 2 and 3 are then engaged by the nip of the rolls 11 and 12 and are drawn through the rolls and are pressed together thereby so that the melted surface portions are fused together.

The welded wrap-around sleeve product is seen partially in mutually perpendicular cross sections in FIGS. 4 and 6. In this example, the functional coating 4 is covered with a release liner in the form of a self supporting strippable polymer film 14 which is removed before use of the sleeve.

As seen in FIGS. 5 and 6, the width of the zone 16 which is melted by the wedge 16 and fused between the rollers 11 and 12 may be narrower than the lateral extent of the overlap between the strip 3 and the end portion 2a.

The side of each of the rollers 11 and 12 may be milled as seen in FIG. 5 to improve the grip on the strips and sheets drawn therethrough.

The strip 3 may be supplied to the welding apparatus in the form of a continuous strip from a roll thereof and may be severed or trimmed to the width of the sheets 2 by guillotine blades disposed upstream from the rollers 11 and 12.

A gas nozzle 17, inclining toward the axis of the wedge 13 and rollers 11 and 12 in the direction of movement of materials over the wedge 13, may be provided adjacent the rollers 11 and 12 and wedge 13 through which a gas which does not interfere with the welding method and materials, such as air, oxygen or nitrogen is flowed. As presently understood, it appears that a superior weld is achieved when the materials undergoing welding are bathed in a flow of gas during the steps of melting and fusion together.

Typically, in the manufacture of polymeric wrap-around sleeves, the wedge 13 will be maintained at a temperature of about 200 to about 350° C., preferably about 220 to about 320° C., and the surface drive speed of the rollers 11 and 12 will be in the range about 5 to about 50 ft./min., preferably about 5 to about 45 ft./min. The gap between the rollers 11 and 12 will preferably be set such that when the materials to be welded pass through the nip of the rolls a laminating wheel back pressure of about 15 to about 45 psi, preferably about 20 to about 35 psi is generated.

Although the above description provides ample information to enable one skilled in the art to conduct the present welding methods and to fabricate the welded products, for the avoidance of doubt some detailed examples of the methods in accordance with the invention will be given:

EXAMPLE 1

The procedure described above with reference to FIGS. 2 and 3 was followed using the following materials and conditions

| Heat Shrinkable Sheet | |
|---|---|
| Composition: | blend of 40% EVA[1] and 60% LDPE[2] |
| Thickness: | 0.035 inch (stretched) |
| Shrinkage of heating: | 23% |
| Degree of crosslinking: | 61% |
| Functional coating | |
| Composition: | asphaltic mastic |
| Thickness: | 1.5 mm |
| Substantially Heat Stable Closure Strip | |
| Composition: | blend of 40% LDPE (as above) and 60% LLDPE (linear low density polyethylene MI = 2.3, sp. gr. = 0.917) |
| Thickness: | 0.030 inches |
| Width: | 3.0 inches |
| Degree of crosslinking: | 75% |

Notes:
[1]12% vinylacetate and 88% ethylene-vinylacetate copolymer (melt index = 1)
[2]low density polyethylene (melt index = 2.0 specific gravity = 0.919)

The stainless steel susceptor strip was 0.015 inches thick and 0.5 inches wide and was applied on the overlap portion of the closure strip at a point spaced between the free end of the heat shrinkable sheet and the real edge of the closure strip, so that portions on either side of the steel susceptor strip were left unwelded. The susceptor strip was enveloped in PTFE fabric as a release covering. The assembly was clamped between platens and was exposed to an rf field for 10 seconds using a 10 KW Westinghouse 4 megahertz RF generator type 20 K65, set at 9.45 grid tuning and 5.5 power (output reading 300 amps). The assembly was compressed at 80 psi between the platens. After the field was switched off, the platens were left closed for 10 to 20 seconds to allow internal coolant within the platens to cool the susceptor strip before the platens were opened.

EXAMPLE 2

Example 1 was repeated except the susceptor strip was used without any release covering and was applied direct to the upper side of the closure strip.

The power setting was 4.0 (150 amps), and the field was applied for 15 seconds. The pressure between the platens was 80 psi.

EXAMPLE 3

Example 1 was repeated except the susceptor strip was 1.0 inch wide and was positioned adjacent the rear edge of the closure strip so that only an overlap portion adjacent the free end of the heat shrinkable sheet was left unfused.

The power setting was 5.5 (300 amps), the field was applied for 10 seconds and the platen pressure was 80 psi.

EXAMPLE 4

Example 3 was repeated except the susceptor strip had no release covering and was applied direct to the upper side of the closure strip.

The power setting was 4.0 (150 amps), the field was applied for 15 seconds and the platen pressure was 80 psi.

EXAMPLE 5

The procedure described above with reference to FIGS. 4 to 6 was followed using the following materials and conditions.

| Heat Shrinkable Sheet | |
|---|---|
| Composition: | blend of 60% LDPE (melt flow index (mfi) = 2, specific gravity (sg) = 0.919) and 40% EVA (12% VA, mfi = 1, sg = 0.932), together with small amounts of additives such as colorant and antioxidant. |
| Thickness: | 0.035 inch |
| Shrinkage on heating: | 30% |
| Crosslinking: | electron beam crosslinking characterized by 20 psi tensile at 300% elongation and 990% ultimate elongation at 135° C. |
| Functional Coating | |
| Adhesive: | 0.050 inches thick on obverse of heat shrinkable sheet with release liner. |
| Substantially Heat Stable Closure Strip | |
| Composition: | same as heat shrinkable sheet |
| Thickness: | 0.028 inch |
| Crosslinking: | electron beam crosslinking characterized by 90 psi tensile at 300% elongation and 520% ultimate elongation at 135° C. |

The welding was performed using a Pfaff model no. 8309-124 hot wedge welding machine equipped with a thermistor controlled heated wedge. The wedge temperature was maintained at 274° C., the drive speed of the nip rolls at 22 ft./min., and a gap of 0.107 inches was set between the nip rolls. The back pressure between the nip rolls, as indicated by the gauge on the machine, was 30 psi. A flow of nitrogen gas was provided to bathe the area adjacent the wedge and nip rolls.

When subjected to peel strength testing DIN 30672 method 1, the weld had peel strength of 22 lb./in. The failure was cohesive, that is to say the strip and sheet did not peel apart but failed by elongation of the strip or of the sheet. The weld was homogeneous.

EXAMPLE 6

The procedure of Example 5 was repeated except for the following:

| Heat Shrinkable Sheet | |
|---|---|
| Composition: | blend of 40% LDPE (as in Example 5) and 60% LLDPE (linear low density polyethylene, mfi = 2.3 sg = 0.917) plus additives as in Example 5 |
| Thickness: | 0.034 inch |
| Shrinkage on heating: | 25% |
| Crosslinking: | electron beam crosslinking to 25 psi tensile at 300% elongation and greater than 1080% ultimate elongation at 135° C. |
| Functional coating | |
| Adhesive: | 0.066 inch thick on obverse of backing with release liner. |
| Substantially Heat Stable Closure Strip | |
| Composition: | same as heat shrinkable sheet of this Example |
| Thickness: | 0.032 inches |
| Crosslinking: | Electron beam crosslinking characterized by 90 psi tensile and 820% ultimate elongation at 135° C. |

The welding was performed under the same wedge temperature and drive speed as Example 5. The gap between the rolls was set at 0.115 inch and the back pressure was 20 psi. The welding area was bathed with a flow of air.

The peel strength of the weld was 24 lb./in. The failure was cohesive (indicating a homogeneous weld) with elongation of the strip. The lap shear testing (ASTM D 1002) gave tensile failure of the backing and strip at greater than 42 psi.

EXAMPLE 7

The procedure of Example 5 was followed except for the following:

| Heat Shrinkable Sheet | |
|---|---|
| Composition: | LMDPE (linear medium density polyethylene, mfi = 2.5, sg = 0.935) plus additives as in Example 5 |
| Thickness: | 0.024 inch |
| Shrinkage on heating: | 25.9% |
| Crosslinking: | Electron beam crosslinking to 85 psi tensile and 860% ultimate elongation at 135° C. |
| Functional Coating | |
| Adhesive: | 0.064 inch thick on obverse of backing with release liner. |
| Substantially Heat Stable Closure Strip | |
| Same as Example 6 | |

The welding was performed at a wedge temperature of 232° C., drive speed 15 ft./min., gap was set at 0.110 in. and the back pressure was 30 psi. Oxygen gas was supplied to bathe the welding area.

The weld had 5 lb./in. peel strength and failed adhesively (along the interface between the strip and sheet). The weld was not homogeneous but was uniform and would be adequate for some purposes. The weld had greater than 42 psi lap shear strength tensile failure of the sheet and strip.

EXAMPLE 8

The procedure of Example 5 was followed except:

| Heat Shrinkable Sheet | |
|---|---|
| Same as Example 5. | |
| Functional Coating | |
| Adhesive: | 0.050 inches thick on obverse of heat shrinkable sheet with release liner. |
| Substantially Heat Stable Closure Strip | |
| Composition: | Same as Example 5 |
| Thickness: | Same as Example 5 |
| Crosslinking: | Electron beam crosslinking characterized by 45 psi tensile at 300% elongation and 740% ultimate elongation at 135° C. |

The welding was performed with a wedge temperature of 315° C., drive speed of 8 ft./min., the gap was set at 0.107 inches, and the back pressure was 30 psi. Oxygen gas was supplied to the welding area.

In peel strength testing the weld failed cohesively (greater than 24 lb./in. peel strength) and the weld exhibited greater than 30 psi lap shear with tensile failure of the sheet and the strip.

We claim;

1. A heat shrinkable wrap-around sleeve adapted to be applied to an article in wrapping relation thereto comprising a sheet of dimensionally heat unstable flexible material having longitudinally spaced end portions capable of being brought into overlapping relation when the sheet is applied to the article, the material having been stretched in the longitudinal direction from an original heat stable form to a dimensionally heat unstable form capable of moving in the direction of its original form by the application of heat alone, and a substantially dimensionally heat stable closure strip having one edge disposed on one of the end portions of said sheet and welded thereto through a uniform welded bond, said strip being of sufficient width that when the end portions of the sheet are brought together annd the end portion having the closure strip is overlapped on the opposite end portion, the free edge of the closure strip can be applied on the underlapping end portion and welded thereto by direct heating applied thereon.

2. A sleeve as claimed in claim 1 wherein said welded is homogeneous.

3. A sleeve as claimed in claim 1 wherein said sheet material and said strip are each about 0.015 to about 0.1 inches thick.

4. A sleeve as claimed in claim 3 wherein said sheet material and strip are each about 0.025 to about 0.08 inches thick.

5. A sleeve as claimed in claim 1 wherein said sheet material and strip each comprise a polyolefin, a blend of polyolefins, a blend of a polyolefin with an olefin copolymer or with an elastomer or with a mixture thereof, an elastomer, a thermoplastic elastomer, or a mixture thereof.

6. A sleeve as claimed in claim 1 wherein said sheet material is crosslinked to a degree of about 25% to about 85% and said strip to a degree higher than said sheet material.

7. A sleeve as claimed in claim 6 wherein said sheet material is crosslinked to a degree of about 45% to about 85%.

8. A sleeve as claimed in claim 1 wherein said sheet material is crosslinked so that at 135° C. the tensile stress required for 300% elongation is about 10 to about 130 psi and its ultimate elongation is about 700% to about 1300%, and the strip is crosslinked to a degree higher than the sheet material.

9. A sleeve as claimed in claim 8 wherein said tensile stress is about 15 to about 110 psi and said ultimate elongation is about 800% to 1100%.

10. A sleeve as claimed in claim 1 wherein said sheet material has a functional coating on one side which is intended to be applied against the article to be wrapped.

11. A sleeve as claimed in claim 10 wherein said functional coating is a sealant or an adhesive material.

12. A sleeve as claimed in claim 1 wherein said strip is clear.

13. A sleeve as claimed in claim 12 having a temperature sensitive visual indicator on the underside of and visible through said clear strip.

14. A sleeve as claimed in claim 1 wherein said strip is of uniform composition throughout and is free from reinforcement.

* * * * *

UNITED STATES PATENT AND TRADEMARK OFFICE
CERTIFICATE OF CORRECTION

PATENT NO. : 5,134,000
DATED : July 28, 1992
INVENTOR(S) : James L. Smythe et al It is certified that error appears in the above-identified patent and that said Letters Patent is hereby corrected as shown below:

In the ABSTRACT, Line 9, change "wedged" to -- wedge --.

Col. 10, line 20, after "welded" insert -- bond --.

Signed and Sealed this

Third Day of May, 1994

Attest:

BRUCE LEHMAN

Attesting Officer

Commissioner of Patents and Trademarks